United States Patent [19]

Hönemann

[11] 4,365,697

[45] Dec. 28, 1982

[54] FRICTION CLUTCH

[75] Inventor: Rudolf Hönemann, Ottersweier, Fed. Rep. of Germany

[73] Assignee: Luk Lamellen und Kupplungsbau GmbH, Buhl, Fed. Rep. of Germany

[21] Appl. No.: 165,545

[22] Filed: Jul. 3, 1980

[30] Foreign Application Priority Data

Jul. 6, 1979 [DE] Fed. Rep. of Germany ....... 2927391

[51] Int. Cl.³ .............................................. F16D 13/44
[52] U.S. Cl. ................................................ 192/89 B
[58] Field of Search ................... 192/89 B, 98, 109 A, 192/109 R; 267/161, 162

[56] References Cited

U.S. PATENT DOCUMENTS

| | | | |
|---|---|---|---|
| 2,885,047 | 5/1959 | Kehrl | 192/89 B |
| 3,213,991 | 10/1965 | Smirl et al. | 192/89 B |
| 3,595,355 | 7/1971 | Maucher et al. | 192/89 B |
| 4,114,742 | 9/1978 | Rawlings | 192/89 B |
| 4,126,216 | 11/1978 | Babcock et al. | 192/89 B |
| 4,273,228 | 6/1981 | Huber | 192/89 B |

FOREIGN PATENT DOCUMENTS

| | | | |
|---|---|---|---|
| 1808802 | 6/1970 | Fed. Rep. of Germany | 192/109 A |
| 1388072 | 3/1975 | United Kingdom | 192/89 B |

*Primary Examiner*—George H. Krizmanich
*Attorney, Agent, or Firm*—Kontler, Grimes & Battersby

[57] ABSTRACT

A friction clutch having a diaphragm spring formed with a ring-shaped base and tabs extending radially inwardly from the base and separated by slots from one another. The slots terminate radially outwardly in hole-like cutouts and the disc spring is tiltably supported on a part of the clutch and is clamped between a first roll-off support at the clutch part and a substantially circular discrete second roll-off support at the side of the disc spring facing away from the clutch part. The second roll-off support is acted upon by the spring when the clutch is disengaged and the first roll-off support is acted upon by the spring when the clutch is engaged. Holding means secure the second support to the clutch part, and the second roll-off support engages the spring radially outwardly of the cutouts and is formed, in the vicinity of each of the cutouts, with an interruption extending along at least 50% of the length of the respective cutout, as considered in the circumferential direction clutch.

12 Claims, 4 Drawing Figures

FRICTION CLUTCH

The invention relates to a friction clutch and, more particularly, to a friction clutch having a disc spring or diaphragm spring formed with a ring-shaped base and radially inwardly directed tabs starting or extending from the ring-shaped base and separated by slots from one another, the slots terminating radially outwardly in hole-like cutouts and the disc spring being tiltably supported on a clutch part, such as a cover, in that it is clamped between a roll-off support at the clutch cover side and a substantially circular roll-off support provided at the side of the disc spring facing away from the clutch cover, one of the roll-off supports being acted upon when the clutch is disengaged and the other of the roll-off supports when the clutch is engaged.

In such friction clutches which have become known heretofore, for example, from German Pat. No. 756,351, wire rings disposed at the same diameter on both sides of the tiltable clutch disc spring are provided as roll-off supports therefor, one of the embodiments shown therein having the cover connected with the spring and the wire rings into a unit by means of rivets, and another embodiment shown therein, by means of straps which are bent out of the cover in the axial direction and extend through the disc spring with portions bent radially outwardly and engaging beneath the ring provided on the side of the disc spring facing away from the cover. In another possible embodiment disclosed in the aforementioned German patent, one of the roll-off supports for the clutch disc spring is formed on the cover side by a bead provided on the cover, and the opposing roll-off support by a roll-off ring, the disc spring and the roll-off ring being linked to the cover by means of tabs which are bent out of the cover in axial direction and extend through the disc spring and the roll-off ring and are braced behind the latter.

In disc springs of such friction clutches, the highest notch stresses occur in those regions of the ring-shaped base which adjoin the hole-like cutouts. Therefore, special care is generally taken in the design of such cutouts to break down these notch stresses. Because of given conditions or circumstances, however, the roll-off supports, in many cases lie adjacent those radial regions of the disc spring at which the hole-like cutouts terminate, or somewhat radially beyond them, as is shown in FIGS. 1 and 6 of the aforementioned German patent. When the clutch is disengaged, additional stresses occur thereat because the disc spring is braced against the at least approximately continuous circular roll-off support; these stresses are superimposed upon the hereinaforementioned notch stresses and cause increased stresses in these regions. The useful life of the disc spring and, therefore, also of the clutch is thereby considerably reduced.

It is a further disadvantage of such clutches that there must be play between the roll-off supports and the disc spring in order to ensure proper or trouble-free operation or tilting of the disc spring when the clutch is engaged and disengaged. This play, which becomes greater over the operating time of the clutch due to the wear at the disc spring support, results, however, in a loss of lift at the pressure plate which is proportional to the order of magnitude of the play per se and therefore increases over the operating time of the clutch.

To avoid the last-mentioned disadvantage, there is provided in German Pat. No. 1,775,116 that the support at the clutch disc spring acted upon by the latter to operate or actuate the clutch is subject to a bracing spring force which is greater in the wear region of the support and/or the disc spring than the force exerted on the support by the clutch disc spring. This results in an automatic readjustment of the wear which occurs. However, in this case, too, these additional stresses occur at the regions adjoining the hole-like cutouts of the ring-shaped base when the clutch is disengaged, as mentioned hereinbefore in connection with German Pat. No. 756,351, because the disc spring is clamped.

It is accordingly an object of the invention of the instant application to provide a friction clutch wherein these disadvantages are eliminated in order to eliminate the danger of breakage or fracture and, thereby, to increase the life of the disc spring and thus also of the clutch.

With the foregoing and other objects in view, there is provided, in accordance with the invention, a friction clutch having a disc spring or diaphragm spring formed with a ring-shaped base and radially inwardly directed tabs extending from the ring-shaped base and separated by slots from one another, the slots terminating radially outwardly in hole-like cutouts, the disc spring being tiltably supported on a part of the clutch, such as a cover thereof, and being clamped between a first roll-off support at the clutch part and a substantially circular roll-off discrete second support at the side of the disc spring facing away from the clutch part, the second roll-off support being acted upon by the diaphragm spring when the clutch is disengaged and the first roll-off support being acted upon by the diaphragm spring when the clutch is engaged, and holding means securing the discrete part to the clutch part, the roll-off support of the discrete part supporting the disc spring radially outwardly of the hole-like cutouts and being formed, in the vicinity of each of the hole-like cutouts, with an interruption extending along at least 50% of the length of the respective hole-like cutout, as considered in the circumferential direction and, in fact, relative to the corresponding length of the cutout. Due to the fact that the roll-off support, which is constructed as an individual or transition part connected to the cover, does not additionally stress, as much as possible, these highly stressed transistion regions of the ring-shaped base of the disc spring to the hole-like cutouts by contact pressure, in that the support regions are set back with respect to the disc spring otherwise occuring harmful effects cannot occur, and the service life of the disc spring and, also, of the clutch can thus be increased considerably and, respectively, the permissible load capacity can be increased for the same stress.

In clutches with disc springs, of which the radially outer contours of the hole-like cutouts extend approximately tangentially or chord-like, respectively, as is the case, for example, with rectangular cutouts, or approximately in circumferential direction, as is the case, for example, with stamped-out cutouts of predominantly ellipsoidal shape extending in circumferential direction, the interruptions extend, as far as possible in the circumferential direction along approximately the entire length of each of the hole-like cutouts. In the case of disc springs having circular hole-like cutouts, or hole-like cutouts tapering radially outwardly, the interruptions can extend only over part of the cutouts in circumferential direction.

In accordance with another feature of the invention, the roll-off support having the interruptions is spring-loaded, so that automatic readjustment for wear possibly occurring at the roll-off supports or the disc spring is effected.

In accordance with a further feature of the invention, in this connection, the roll-off support having the interruptions is itself formed or constituted by a resilient structural member such as a disc spring, in particular.

Then, in accordance with an added feature of the invention, the holding means extend from the clutch cover through the disc spring in axial direction and connect the discrete part formed with the roll-off support having the interruptions to the clutch cover.

In accordance with an alternate feature of the invention, the roll-off support with the interruptions is formed by a ring and, more specifically, a wire ring, the bracing or supporting region of which has respective interruptions and steps or shoulders.

In accordance with yet another feature of the invention, the interruptions of the respective roll-off support are axial depressions and projections in the discrete part which are provided in alternating succession. This can be accomplished, also in accordance with the invention, in a particularly simple manner by forming the interruptions of the respective roll-off support by material deformation, such as by embossment, especially. A further feature of the invention is to form the interruptions of the respective roll-off support by material removal. Such material removal may be effected by mechanical machining.

In accordance with a concomitant feature of the invention, the interruptions of the respective roll-off support are constituted by holes formed in the discrete part in the region of the diameter of the respective roll-off support.

Other features which are considered as characteristic for the invention are set forth in the appended claims.

The invention is not intended to be limited to the details shown, since various modifications and structural changes may be made therein without departing from the spirit of the invention and from the scope and range of equivalents of the claims.

The construction and mode of operation of the invention, however, together with additional features and advantages of the improved clutch, will be best understood from the following description of specific embodiments when read in connection with the accompanying drawing, in which.

Figure 1:
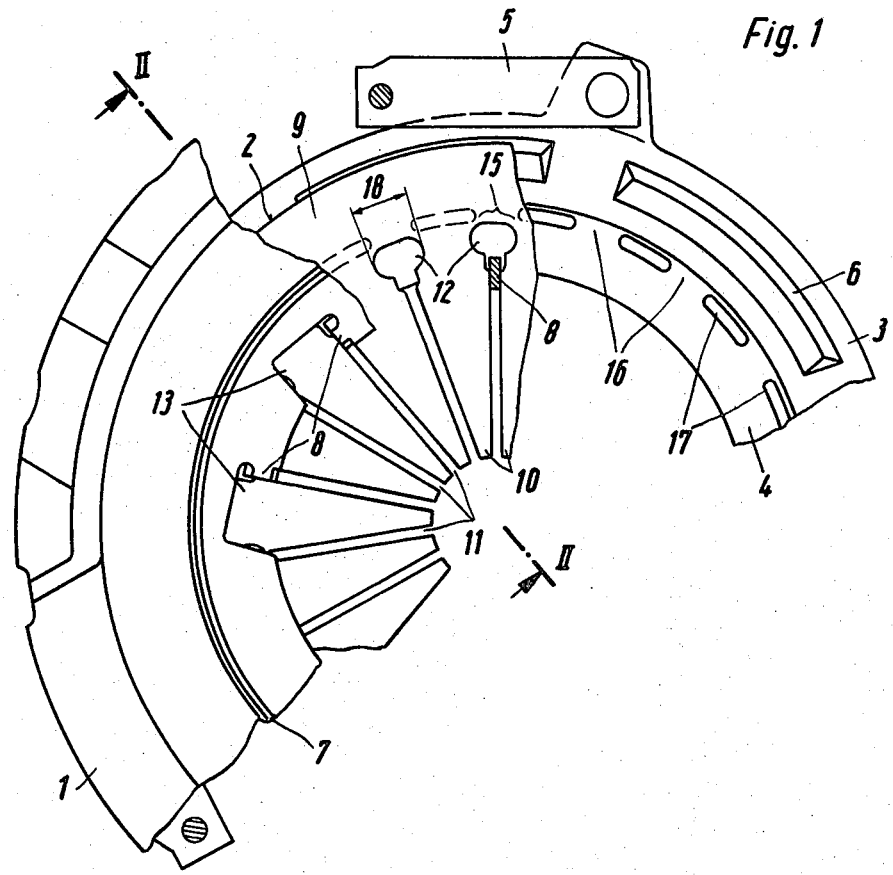
FIG. 1 is a fragmentary front elevational view, partly broken away, of a friction clutch constructed in accordance with the invention.

Referring first to FIG. 1, there can be seen, starting at the left-hand side as seen by the viewer, a cover 1, and then a disc spring 2, a pressure plate 3 and a roll-off or ride-on support 4. To transmit the torque between the cover 1 and the pressure plate 3, the clutch is provided with leaf springs 5 in a conventional manner.

In FIG. 2 there can again be seen the cover 1 and the disc spring 2 which is braced radially outwardly against bosses or cams 6 formed on the pressure plate 3 and is tiltably clamped at the cover 1 between two roll-off supports 7 and 4. The disc spring 2 is fastened to the cover 1 by holding means 8 which engage behind the roll-off support 4 and pass through the disc spring 2 in axial direction.

Figure 2:
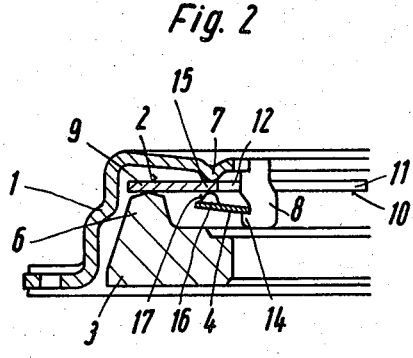
FIG. 2 is a cross sectional view taken along the line II—II of FIG. 1.

The disc spring 2 shown in FIGS. 1 and 2 has a conventional ring-shaped base 9 wherefrom radially inwardly directed tabs 10, which are separated from one another by slots 11, extend and terminate radially outwardly in hole-like cutouts 12.

It is further apparent from FIGS. 1 and 2 that the two roll-off supports 4 and 7 clamp the disc spring 2 radially outside the hole-like cutouts 12. The roll-off support 4 is formed, for this purpose, like a disc spring member fastened to the cover 1 by the holding means 8 which, as can be seen from FIG. 1, are punched from the material of the cover 1 by a cut 13 extending at least approximately in direction of a chord and are then bent over so as to point in axial direction, the holding means 8 having a stamped-out projection or nose 14 by which they engage beneath the roll-off support 4.

In order to prevent additional stresses from occurring in the highly stressed transition regions 15 of the ring-shaped base 9 of the disc spring 2 of the hole-like cutouts 12 when the clutch is disengaged, the disc spring-like part 4 has interruptions 16 in these regions.

In the embodiment shown in FIGS. 1 and 2, the roll-off support 4 is formed with axial depressions which are provided in alternating sequence and constitute the interruptions 16, and also with axial projections 17 which form the roll-off region for the disc spring 2. The projections 17 are formed by material deformation such as by embossing, for example.

Because of the outer contours of the hole-like cutouts 12, which extend substantially tangentially or chord-like relative to the disc spring 2, the interruptions 16 extend over approximately the entire region 18 of the hole-like cutouts in the circumferential direction.

The interruptions 16 in the disc spring-like part 4 may also be formed by providing holes instead of depressions in the regions 16.

Figure 3:
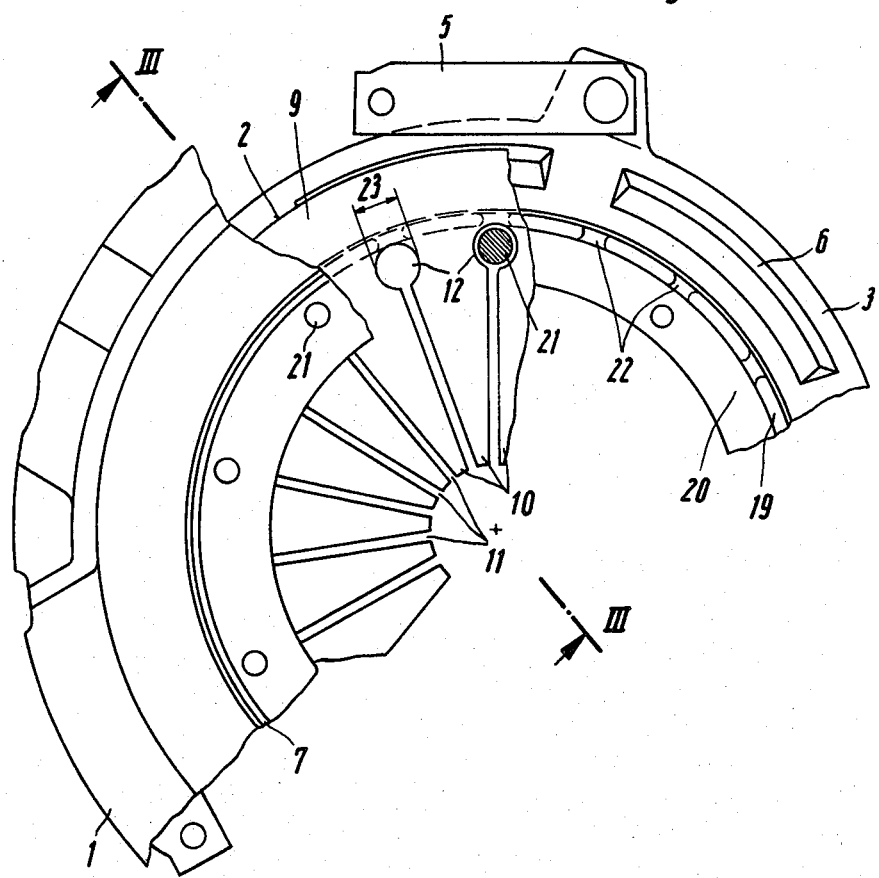
FIG. 3 is a view similar to that of FIG. 1 but showing another embodiment of the invention.
Figure 4:
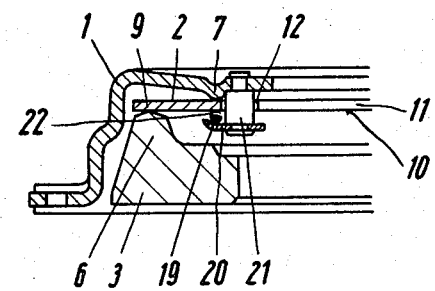
FIG. 4 is a cross sectional view taken along the line III—III of FIG. 3.

In FIGS. 3 and 4, there are again shown the cover 1, the disc spring 2 with the ring-shaped base 9 thereof and the radially inwardly directed tabs 10 starting from the ring-shaped base 9 and separated from one another by the slots 11 which terminate radially outwardly in the hole-like cutouts 12. Furthermore, the pressure plate 3, the bosses 6 of which are acted upon by the radially outer regions of the disc spring 2, can also be seen in FIGS. 3 and 4.

The disc spring 2 is fastened to the cover 1 by being clamped between a roll-off support 7 on the cover side and a further roll-off support on the side facing away from the cover and constructed in the form of a wire ring 19. The wire ring 19 is held by a ring-shaped support dish 20, which is fastened to the cover by holding or retaining pins 21. At each cutout 12 of the disc spring 2, the wire ring 19 has an interruption 22 which extends along at least approximately 50% of the length 23 of the hole-like cutouts 12, as seen in the circumferential direction, so that no additional stresses occur in these regions when the clutch is disengaged.

In clutches, wherein the wire ring 19 is supported directly by holding or retaining pins 21, it may be advantageous if an interruption 22 is provided at least at each cutout 12 of the disc spring through which a holding or retaining pin 21 passes.

The interruptions 22 of the wire ring 19 may be formed by material removal or also by material deformation. The wire ring may be held in position by any suitable, conventional anti-rotation or anti-torsion device or the like.

I claim:

1. A friction clutch, comprising a diaphragm spring including a ring-shaped base and tabs extending radially inwardly from the base and separated by slots terminating radially outwardly in hole-like cutouts, a clutch part having a first roll-off support at one side of the spring, a substantially circular discrete second roll-off support at the other side of the spring, the second roll-off support being acted upon by the spring when the clutch is disengaged and the first roll-off support being acted upon by the spring when the clutch is engaged, and holding means securing the second support to the clutch part, the second support engaging the spring radially outwardly of the cutouts and having, in the vicinity of each of the cutouts, an interruption facing the spring and extending along at least 50% of the length of the respective cutout, as considered in the circumferential direction of the clutch.

2. The clutch of claim 1, wherein the second roll-off support is spring-loaded.

3. The clutch of claim 1, wherein the second roll-off support is a resilient member.

4. The clutch of claim 3, wherein said resilient member is a plate spring.

5. The clutch of claim 1, wherein the clutch part is the cover of the clutch and the holding means extend from the clutch cover axially through the spring and connect the second roll-off support to the clutch cover.

6. The clutch of claim 1, wherein the second roll-off support is a ring.

7. The clutch of claim 6, wherein said ring is a wire ring.

8. The clutch of claim 1, wherein the interruptions of the second roll-off support are axial depressions and the second support includes projections alternating with said interruptions.

9. The clutch of claim 1, wherein the interruptions of the second roll-off support are deformed portions of such second support.

10. The clutch of claim 1, wherein the interruptions of the second roll-off support are embossments in the material of said second support.

11. The clutch of claim 1, wherein the interruptions of the second roll-off support are voids in said second support.

12. The clutch of claim 1, wherein the interruptions of the second roll-off support are holes provided in said second roll-off support.

* * * * *

UNITED STATES PATENT AND TRADEMARK OFFICE
CERTIFICATE OF CORRECTION

PATENT NO. : 4,365,697
DATED : December 28, 1982
INVENTOR(S) : Rudolf HÖNEMANN

It is certified that error appears in the above-identified patent and that said Letters Patent are hereby corrected as shown below:

Col. 2, line 43, "transition" should read --discrete--;
       line 45, "transistion" should read --transition--.

Signed and Sealed this

Nineteenth Day of June 1984

[SEAL]

Attest:

GERALD J. MOSSINGHOFF

Attesting Officer

Commissioner of Patents and Trademarks